(12) United States Patent
Clements et al.

(10) Patent No.: US 8,395,124 B2
(45) Date of Patent: Mar. 12, 2013

(54) ARTICLE INSPECTION SYSTEM AND METHOD

(75) Inventors: Minot Clements, Charlottesville, VA (US); Bradley Kingston, Manhattan Beach, CA (US); David Kuo, Redondo Beach, CA (US); David Penn, Chantilly, VA (US); Lawrence K. Warman, Lothian, MD (US)

(73) Assignee: Raytheon Applied Signal Technology, Inc., Sunnyvale, CA (US)

( * ) Notice: Subject to any disclaimer, the term of this patent is extended or adjusted under 35 U.S.C. 154(b) by 672 days.

(21) Appl. No.: 12/476,776

(22) Filed: Jun. 2, 2009

(65) Prior Publication Data

US 2010/0302034 A1 Dec. 2, 2010

(51) Int. Cl.
*G01F 23/00* (2006.01)
(52) U.S. Cl. .................................. 250/359.1
(58) Field of Classification Search .............. 250/359.1
See application file for complete search history.

(56) References Cited

U.S. PATENT DOCUMENTS

| | | | |
|---|---|---|---|
| 6,205,195 B1 * | 3/2001 | Lanza | 376/157 |
| 7,244,941 B2 * | 7/2007 | Roos et al. | 250/358.1 |
| 2008/0156997 A1 * | 7/2008 | Kearfott | 250/390.04 |
| 2009/0001262 A1 * | 1/2009 | Visser et al. | 250/282 |

FOREIGN PATENT DOCUMENTS

| | | |
|---|---|---|
| EP | 0 434 058 A1 | 12/1990 |
| EP | 0 434 508 A1 | 12/1990 |
| WO | 96/13839 | 5/1996 |

OTHER PUBLICATIONS

A.V. Kznetsov, "Concept of a Combined Device for Localization and Identification of Explosives", Nov. 13-17, 2006, International Atomic Energy Agency, p. 1-6, Combined Devices for Humanitarian Demining and Explosives Detection http://www-naweb.iaea.org/napc/physics/meetings/TM29225/prcdngs/datasets/foreword_home.html.*

Beyerle, A. et al., "Associated Particle Imaging for General Application to Sealed Container Interrogation," Abstract, 1991 Institute of Electrical and Electronic Engineers (IEEE) Nuclear Science Symposium and Medical Imaging Conference, Nov. 2-9, 1991, Santa Fe, NM, USA.

Buffler, Andy, "Contraband Detection with Fast Neutrons," 9th International Symposium on Radiation Physics, Cape Town, Oct. 26-31, 2003, Department of Physics, University of Cape Town.

(Continued)

*Primary Examiner* — David Porta
*Assistant Examiner* — Hugh H Maupin
(74) *Attorney, Agent, or Firm* — Renner, Otto, Boisselle & Sklar, LLP

(57) ABSTRACT

An inspection system and method for determining the elemental makeup of contents of an article includes a localizer for identifying at least one region of interest of the article from data representative of contents of the article, the at least one region of interest having a cross-sectional area or a volume that is less than the entire cross-sectional area or the entire volume of the article, an associated particle imaging device that produces an output that is indicative of the elemental makeup of contents of the article, a data selector for selecting a portion of the output of the associated particle imaging device that corresponds to respective identified regions of interest, and an analyzer for analyzing the portions of the output of the associated particle imaging device selected by the data selector to determine the elemental makeup of contents of the article in each identified region of interest.

20 Claims, 5 Drawing Sheets

OTHER PUBLICATIONS

Carriveau, Gary W., "Associated Particle Imaging: An Enabling Technology of Detection of Improvised Explosives," Abstract, Detection and Disposal of Improvised Explosives, 2006, pp. 123-125, vol. 2006, Springer Netherlands.

Hurley, J.P., et al., "A Review of the Associated Particle Imaging Technique," Abstract, International Conference on the Application of Accelerators in Research and Industry, Nov. 2-5, 1992, Denton, TX USA.

European Search Report for corresponding European Application No. 10164580.2-1240 / 2259092 mailed Feb. 16, 2012.

"Associated Particle Imaging," Characterization, Monitoring and Sensor Technology Catalogue, Sep. 1995, Center for Environmental Management Information.

Kunzetsov, A.V., et al., "Concept of a Combined Device for Localization and Identification of Explosives," pp. 1-7, V.G. Khlopin Radium Institute, 28, $2^{nd}$ Murinsky pr., 194021, Saint-Petersburg, Russia.

Kuznetsov, A.V., et al., "Concept of a Combined Device for Localization and Identification of Explosives," pp. 1-7, Proceedings of an IAEA Technical Meeting, Padova, Nov. 13-17, 2006, IAEA-TM-29225.

Gozani, Tsahi, "A Review of Neutron Based Non-Intrusive Inspection Techniques," pp. 1-12, Hoover Institute National Security Forum, Mar. 12-13, 2002.

Kunzetsov, A.V., et al., "Detection of buried explosives using portable neutron sources with nonosecond timing", pp. 51-57, Proceedings of the Third RCM on the Application of Nuclear, Techniques to Anti-personnel Landmines Detection, International Atomic Energy Agency, Vienna, Austria, May 2003.

\* cited by examiner

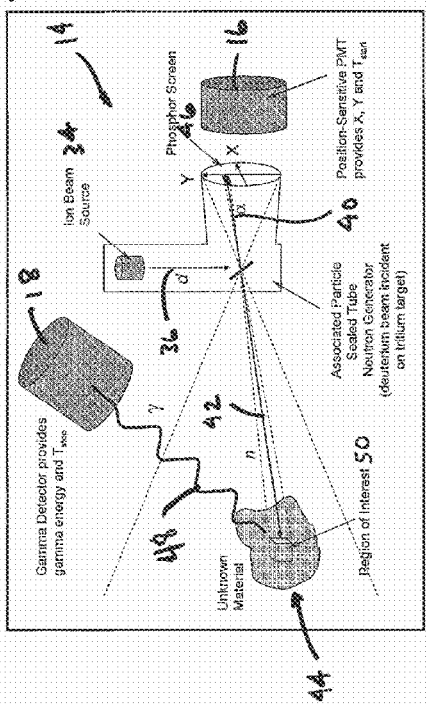
FIG. 3
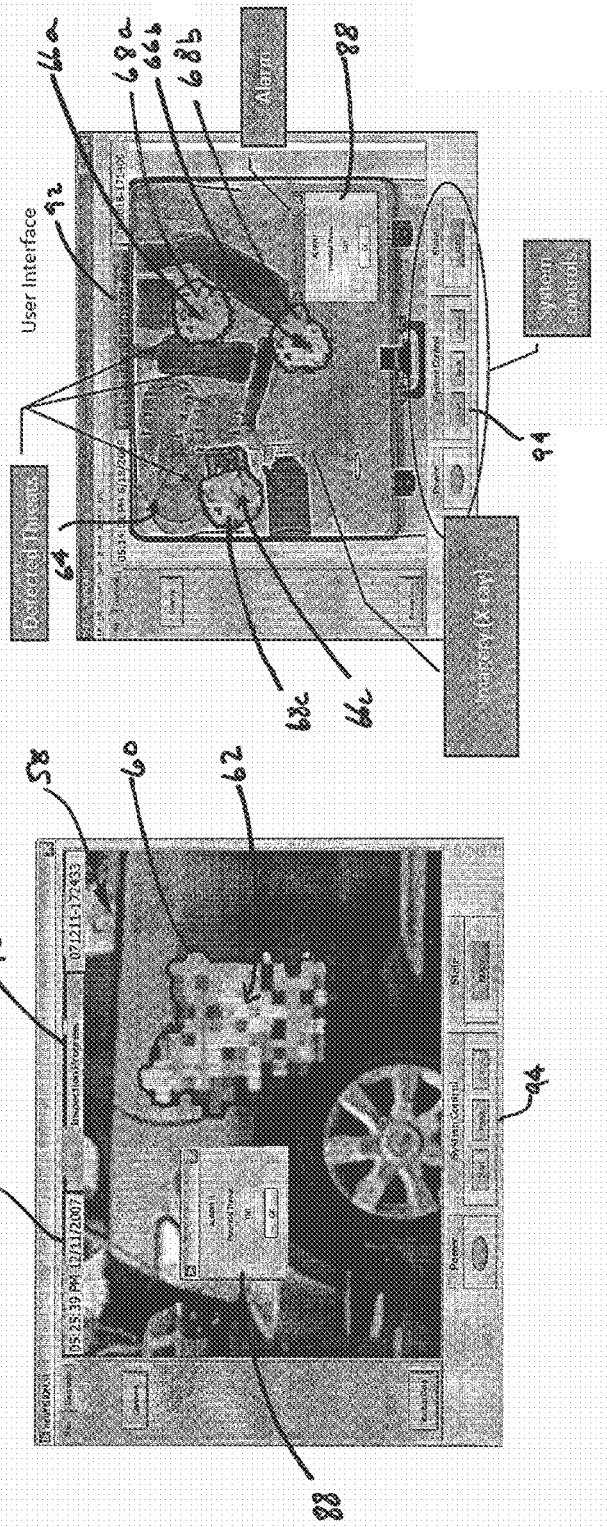
FIG. 4A
FIG. 4B

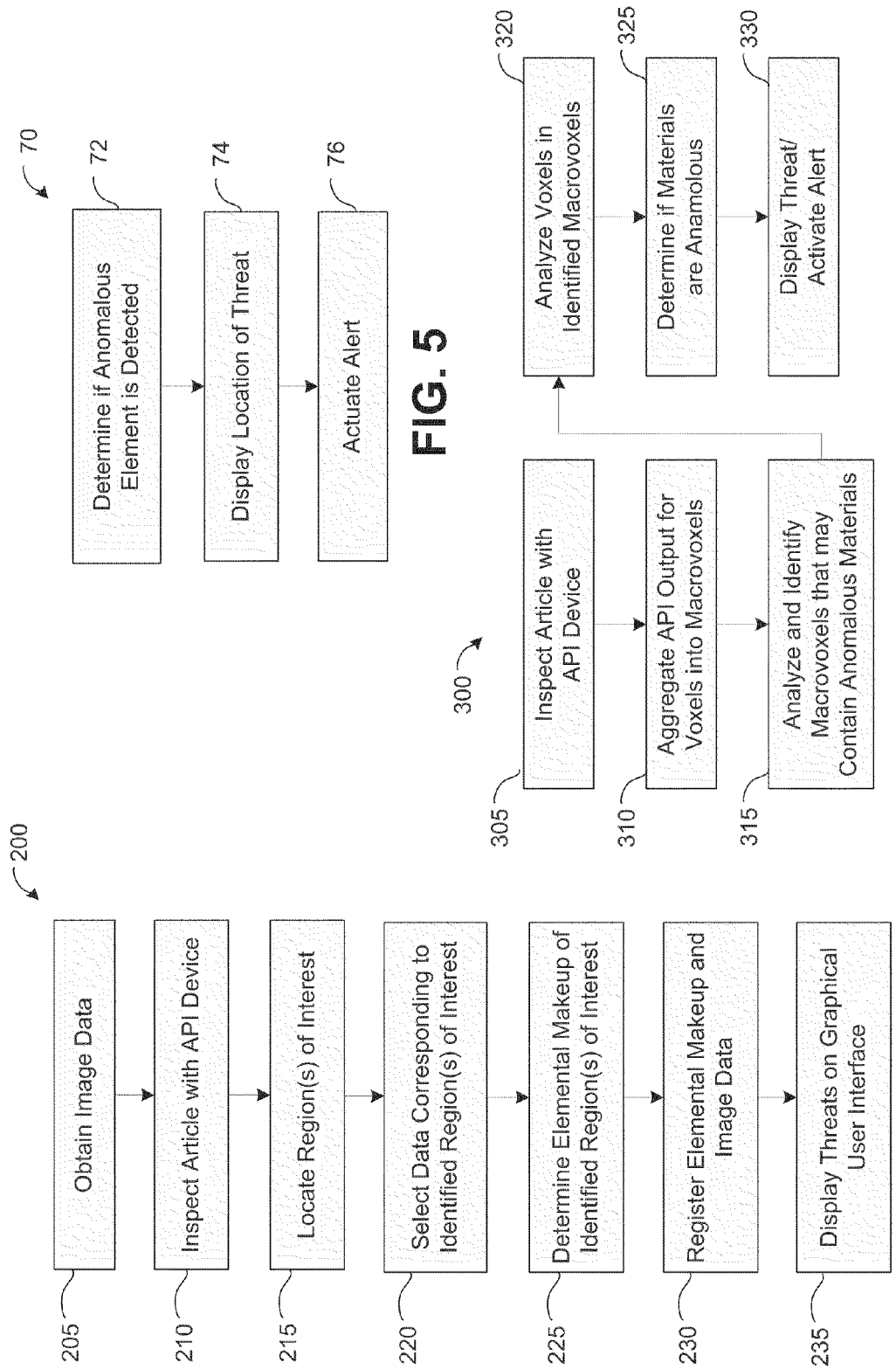

ARTICLE INSPECTION SYSTEM AND METHOD

FIELD OF THE INVENTION

The invention is in the field of inspection systems to detect suspicious, dangerous and/or illegal materials in articles such as parcels, luggage, vehicles, and shipping containers, etc.

DESCRIPTION OF THE RELATED ART

Inspection systems commonly are used to detect drugs, weapons and other illegal items in many different environments, ranging from the inspection of mail, or luggage to the inspection of large freight containers used for shipping materials long distances. In many environments, it is necessary to quickly and accurately inspect a large number of articles in a short period of time. For example, in an airport, it may be necessary to inspect every piece of luggage for illegal drugs or other threats, such as weapons, explosives and/or chemical and biological agents before loading the luggage onto the airplane. Such inspection must be performed quickly and accurately to avoid causing travel delays.

Nuclear inspection systems, such as those that include x-ray imaging devices, are commonly used in airports to inspect baggage for objects having a density that is similar to the density of high explosives or for objects that have a similar shape to weapons or other dangerous materials. Once identified, these bags typically are inspected further by hand or destroyed. X-ray imaging devices are limited in the sense that they may produce ambiguous results with respect to many materials, including some plastics that may be used in explosives. As a result, X-ray inspection devices can have a high false alarm rate in which otherwise harmless objects are misidentified as dangerous. Additionally, many nuclear inspection systems have size, weight, and power requirements that make them impractical for many inspection applications, including the inspection of airport luggage.

Another type of nuclear inspection system relies on an associated particle imaging technique (also referred to as "API"). API utilizes a small neutron generator that produces coincident neutrons and alpha particles that travel in opposite directions. An alpha particle detector detects the arrival time and two dimensional (x, y) position of the alpha particle. From that information, the time and direction of the corresponding neutron emission can be determined. This process may be referred to as neutron "tagging".

The tagged neutron produces a gamma ray when it collides with a nucleus in a material. The emitted gamma ray is detected by a gamma ray detector within a few tens of nanoseconds after the alpha particle emission. The velocities of the neutron and the resulting gamma ray are both known quantities, as is the position of the detector that detected the gamma ray. From this information, the arrival time of the gamma ray can be translated into the distance traveled by the neutron to the interaction point. The direction and length of the neutron trajectory can then be converted to spatial coordinates to give the three-dimensional location of the interaction between the neutron and the nucleus.

Each element (e.g., carbon, nitrogen, oxygen, etc.) emits a unique gamma ray (also referred to as a "gamma ray signature") when it is struck by a neutron. By determining the location of the interaction and analyzing the detected gamma ray signature, it is possible to determine the elemental makeup of the nucleus that was struck by the neutron. The API technique produces a large amount of data that is representative of the interactions of the tagged neutrons with the contents of the entire article and surrounding areas. In some inspection systems, the interior of the inspected object is separated into a two-dimensional grid, for example, a 3×3 grid. All of the data for the interior of the object is then processed to determine the relative concentrations of chemical elements for each section of the grid and to provide that location to an operator. Because all of the API data for each grid element is combined, there is significant mixing between the outputs of potentially dangerous materials as well as non-dangerous materials. This may result in a large number of false positives and/or false negatives. Further, given the large amount of data produced by the API device, a significant amount of time and computer resources are required to process the data.

SUMMARY OF THE INVENTION

Disclosed is an inspection system that utilizes the API technique to inspect an article for anomalous elements, such as weapons, drugs, explosives, and/or chemical and biological agents, etc. The inspection system includes a localizer for identifying at least one region of interest in the article that has a cross-sectional area or a volume that is less than the entire cross-sectional area or the entire volume of the article. A data selector selects the portions of the API data that correspond to the identified region(s) of interest. An analyzer analyzes the portions of the API data selected by the data selector to determine the elemental makeup of contents of the article in each identified region of interest. Thus, rather than processing all of the API data, the inspection system only processes the API data that corresponds to the identified region(s) of interest. This reduces the overall processing time for each inspected article, thereby increasing the speed of the system.

The system also may include an imaging device, such as a camera or an x-ray imager, to provide an image of the article being inspected. The localizer can identify the region(s) of interest from areas of uniform density in the image data, which typically are the areas of the article that are likely to contain illegal or dangerous materials. The data selector selects the API data corresponding to the identified areas of uniform density, and only this data is processed by the analyzer. By limiting the analysis to only those areas having a uniform density, the overall amount of data to be processed is reduced. Furthermore, because the API data for other regions of the article is not included in the processed data, the mixing effects caused by other materials in the article are reduced or even eliminated. This reduces the likelihood of false positives and false negatives and also increases the accuracy of the system.

The region(s) of interest may be identified from the API data. The API data corresponds to voxels corresponding to volumetric elements in the article being inspected. The output from each of the voxels may be aggregated into macrovoxels (large voxels) corresponding to large volumetric elements in the article being inspected. The region(s) of interest can be identified by analyzing the aggregated data for each macrovoxel to determine which macrovoxels may contain anomalous elements. The region(s) of interest are then identified by the localizer as those macrovoxels that are likely to contain anomalous elements, e.g., those macrovoxels whose gamma ray signature is similar to that of a known anomalous element or an element commonly occurring in anomalous materials. The analyzer then analyzes the individual voxels in the selected macrovoxels to determine the elemental makeup of each region of interest and to determine if the elemental makeup is anomalous.

Accordingly, disclosed is an inspection system for determining the elemental makeup of contents of an article including a localizer for identifying at least one region of interest of the article from data representative of contents of the article, the at least one region of interest having a cross-sectional area or a volume that is less than the entire cross-sectional area or the entire volume of the article, an associated particle imaging device that produces an output that is indicative of the elemental makeup of contents of the article, a data selector for selecting a portion of the output of the associated particle imaging device that corresponds to respective identified regions of interest, and an analyzer for analyzing the portions of the output of the associated particle imaging device selected by the data selector to determine the elemental makeup of contents of the article in each identified region of interest.

Also disclosed is a method for determining the elemental makeup of contents of an article that includes identifying at least one region of interest of the article from data representative of contents of the article, the at least one region of interest having a cross-sectional area or volume that is less than the entire cross-sectional area or the entire volume of the article, inspecting the article with an associated particle imaging device, the associated particle imaging device producing an output that is indicative of the elemental makeup of contents of the article, selecting a portion of the output of the associated particle device that corresponds to respective identified regions of interest, and analyzing the selected portions of the output of the associated particle imaging device to determine the elemental makeup of contents of the article in each identified region of interest.

The foregoing and other features of the invention are hereinafter fully described and particularly pointed out in the claims, the following description and the annexed drawings setting forth in detail several illustrative embodiments of the invention, such being indicative, however, of but a few of the various ways in which the principles of the invention may be employed.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

In the annexed drawings, which are not necessarily to scale:

FIG. 3 is a schematic diagram of an associated particle imaging device used in the inspection system.

FIG. 4A is an embodiment of a graphical user interface for the inspection system.

FIG. 4B is another embodiment of a graphical user interface for an inspection system.

FIG. 5 is an exemplary algorithm for the graphical user interface.

FIG. 7 is a flowchart depicting a method of processing data in the inspection system.

FIG. 8 is a flowchart depicting another method of processing data in the inspection system.

DETAILED DESCRIPTION

Figure 1:
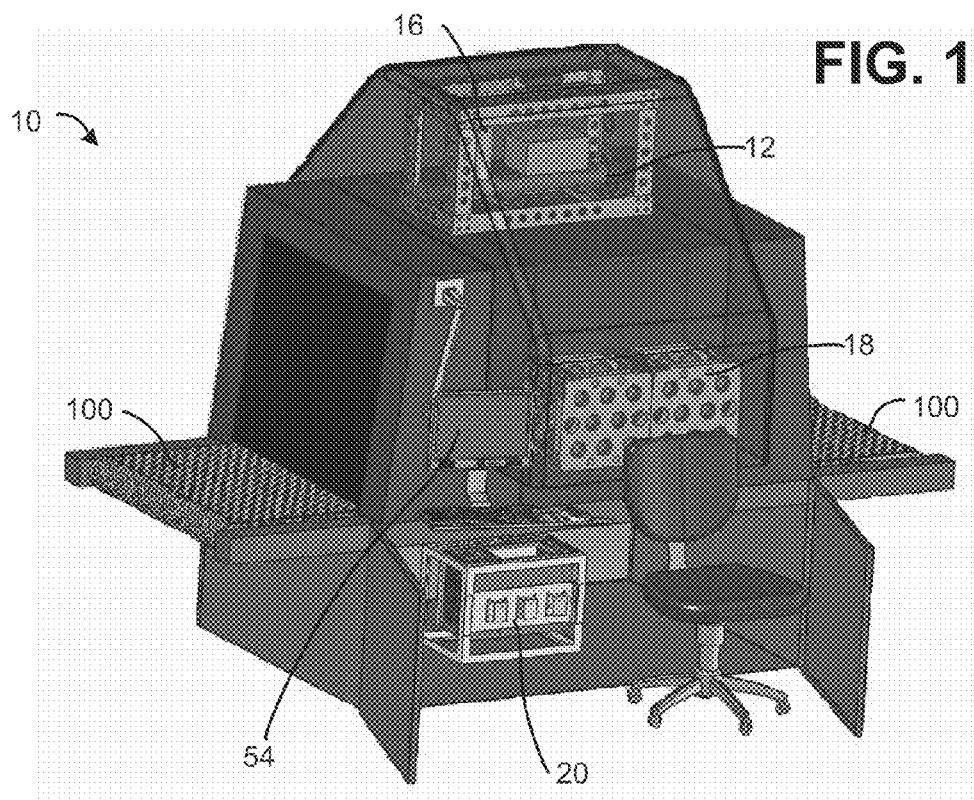
FIG. 1 is an isometric view of an exemplary inspection system according to the present invention.
Figure 2:
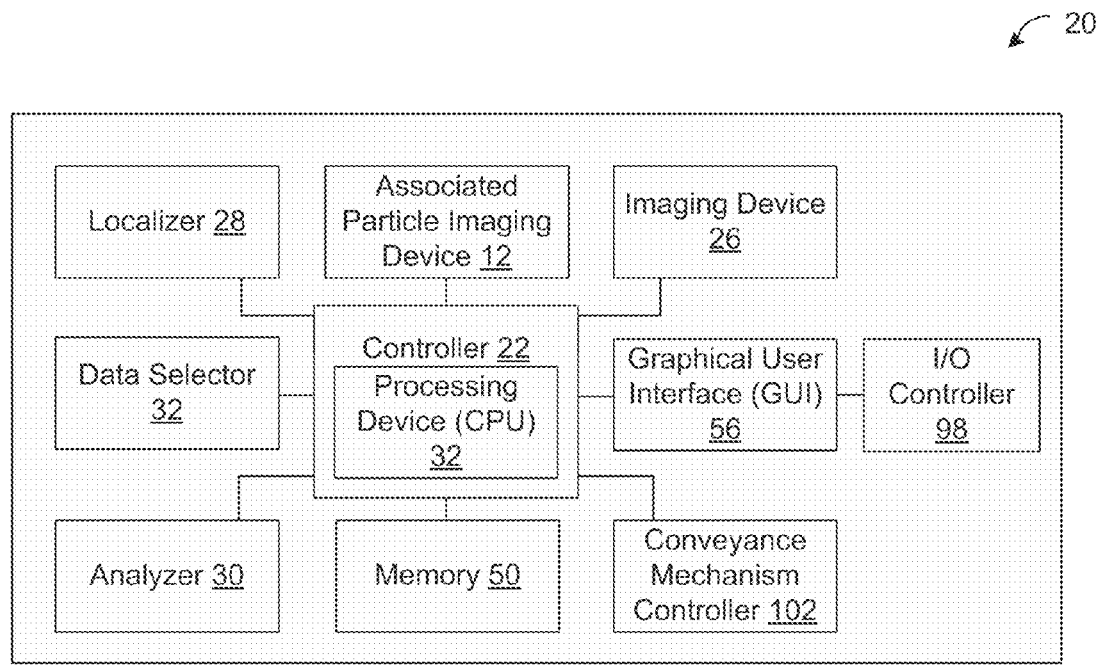
FIG. 2 is a block diagram of a computer system for use with the inspection system of FIG. 1.

Referring initially to FIGS. 1-3, an exemplary inspection system 10 for determining the elemental makeup of an article is shown. In the exemplary embodiment of FIG. 1, the inspection system 10 is a luggage inspection system. The system 10 includes an associated particle imaging device 12 (also referred to as an "API device") that processes data according to the associated particle imaging technique. The API device 12 includes a neutron generator 14, an alpha particle detector 16 and a gamma ray detector 18. The API device 12 generates data that is indicative of the elemental makeup of the contents of the article being inspected. The system 10 also includes a computer 20, which includes a controller 22 and central processing unit (CPU) 24 to control an imaging device 26, a localizer 28, an analyzer 30, and a data selector 32.

The API device 12 and the API technique are described in more detail in FIG. 3. The neutron generator 14 is shown as an associated particle sealed tube neutron generator. The sealed tube neutron generator 14 includes an ion beam source 34 for producing a deuterium beam. The ion beam source 34 emits an ion beam 36 that is incident on a tritium target 38. When the ion beam 36 strikes the tritium target 38, it causes the emission of an alpha particle 40 and neutron 42. The alpha particle 40 and the neutron 42 are emitted in opposite directions, such that the alpha particle 40 is emitted towards the alpha particle detector 16 and the neutron 42 is emitted towards a target 44 that is composed of an unknown material. The alpha particle detector 16 includes a phosphor screen 46 for detecting the location of the alpha particle 40. When the alpha particle 40 strikes or collides with the phosphor screen 46, the coordinates (x, y) of the alpha particle 40 are detected and recorded. The coordinates are used to determine the trajectory of the neutron 42. The detection of the alpha particle is representative of the start time for measuring the distance traveled by the corresponding neutron.

When the neutron 42 collides with an atom in the target 44, a gamma ray 48 is emitted. The gamma ray 48 is detected by the gamma ray detector 18 and the time that the gamma ray 48 is detected is recorded. The time of flight of the neutron 42 can be determined by comparing the time in which the alpha particle 40 was detected by the alpha particle detector 16 to the time in which the gamma ray was detected. This data can be combined with the x, y coordinates of the detected alpha particle 40 to determine the trajectory and distance that the neutron 42 traveled before striking the target 44. From this data, the three-dimensional position of the interaction between the neutron 42 and the atom in the target 44 can be determined.

Each element emits a unique gamma ray signature. By analyzing the gamma rays detected by the gamma ray detector 18, it is possible to determine the elemental makeup of the atom that emitted the gamma ray. The gamma rays or radiation spectra collected by the gamma ray detector 18 for the neutron interactions represents the output of the API device 12. It will be appreciated that the above is but one example of an apparatus for performing the API technique and that other devices may be used to obtain API data.

As described in more detail below, the output of the API device 12 can be processed or analyzed with the computer system 20 to determine the elemental makeup of the article. For the sake of brevity, generally conventional features of the computer will not be described in great detail herein. The computer 20 includes a primary controller 22 configured to carry out overall control of the functions and operations of inspection system 10. The controller 22 may include the processing device 24, such as a CPU, microcontroller or microprocessor. The processing device 24 executes code stored in a memory within the control circuit and/or in a separate memory, such as the memory 50, in order to carry out operations of the inspection system 10. The memory may be, for example, one or more of a buffer, a flash memory, a hard drive, a removable media, a volatile memory, a non-volatile memory, a random access memory (RAM), or other suitable device. The functions of the inspection system 10 may be may be embodied as executable code that is resident in and executed by the computer on a computer-readable or machine-readable medium. The functionality may be a stand-alone software application or form a part of a software application that carries out additional tasks related to the inspection system 10. Although described as being included as part of the computer 20, it will be appreciated that the different components of the inspection system 10 may be separate or stand alone components.

The computer 20 includes the localizer 28 for identifying at least one region of interest in an article being inspected. The localizer 28 identifies the region(s) of interest from data that is representative of the contents of the article. For example, as shown in FIG. 3, the region of interest 50 may be a portion of the target 44. The data that is representative of the contents of the article may be API data from the API device 12 or may be image data from the separate imaging device 26. The data representative of the contents of the article may be two-dimensional or three-dimensional data. The separate imaging device 26 may be a camera, or one or more ancillary sensors employing penetrating radiation such as X-ray, gamma ray, terahertz wave, or ultrasonic sensors gamma ray imaging device, a terahertz imaging device, or a computed tomography imaging device. The region(s) of interest identified by the localizer correspond to the areas or volumes of the article that are likely to contain at least one anomalous element.

The identified region(s) of interest have a cross-sectional area or volume that is less than the entire cross-sectional area or volume of the article. The localizer 28 therefore reduces or limits the amount of data that is analyzed to determine if the article contains an anomalous element. Thus, the localizer 28 identifies only those portions of the API data that correspond to region(s) of interest within the article and the remaining data is disregarded or stored in the memory 50 for later processing or analysis, if needed.

The data representative of the contents of the article may be API data. The API data is collected and stored relative to a plurality of voxels or volume elements in the article being inspected. The voxels may correspond to the size and shape of the article and the contents within in the article. The voxel data may be aggregated into macrovoxels corresponding to larger volumetric elements of the article being inspected. The analyzer 30 analyzes the output for each macrovoxel to determine which macrovoxels are likely to contain one or more anomalous element or to identify which macrovoxels have high levels of elements commonly found in anomalous materials or which can be mixed easily to form an anomalous material. By aggregating the voxels into macrovoxels, the amount of data that is processed to identify the region(s) of interest is reduced from the entire output of the API device 12 to only a subset of aggregated data. Accordingly, the region(s) of interest identified by the localizer 28 are those macrovoxels that are identified as likely to contain an anomalous element.

The data representative of the contents of the article also may be image data obtained by a separate imaging device 26. The image data can be processed to identify those areas or portions of the image that appear to have a uniform or homogenous density, since these are the areas of the article that may contain large enough quantities of anomalous elements to be dangerous or to pose a threat. Typically, these areas are only portions of the article being inspected and therefore, are individually and/or collectively less than the entire cross-sectional area or volume of the article.

After the region(s) of interest are identified by the localizer 28, the data selector 32 selects the data corresponding to the identified regions of interest for further processing by the analyzer 30. The localizer 28 identifies region(s) of interest having a combined cross-sectional area or volume that is less than the overall cross-sectional area or volume of the article and therefore, the data selector 32 selects only a portion of the API data (e.g., an amount of API data that is less than the total amount of API data collected by the API device 12 for the article). Thus, the localizer 28 and the data selector 32 reduce the amount of data that needs to be processed to determine if the article contains an anomalous element.

The analyzer 30 then processes the selected data to determine the elemental makeup of each voxel contained within the identified region(s) of interest. By determining the elemental makeup of the materials in each voxel, it is possible to determine whether the materials in the voxel are anomalous. Additionally, because the identified region(s) of interest generally correspond to the shape of the suspected object, the size and shape of the suspected anomalous element can be estimated. This may facilitate the identification of illegal, dangerous or hazardous materials.

The analyzer 30 may use several different methods for analyzing and processing the output of the API device 12 to determine the elemental makeup of the region(s) of interest. According to one method of processing, each detected spectrum detected by the gamma ray detector 18 of the API device 12 is compared to a sample spectrum from a library of signature spectra. This comparison may be performed for the whole detected spectrum or may be done on a filtered or projected spectrum that contains only certain features from the detected spectrum. This type of processing relies on the detected spectrum having little mixing of spectral content, such as a sample spectrum that is a mixture of the spectrum of water and the spectrum for an explosive. This approach is limited by the list of predetermined signatures contained in the library of spectra signatures. Any spectral mixing caused by background noise, having multiple materials present within the volume element, or the inherent spatial resolution of the system, requires a predetermined entry in the library of signature spectra; otherwise this method will not be able to determine the elemental makeup of the material accurately.

A second method of processing the API data uses a Linear Mixing Model (LMM) or template matching. In this method, the detected spectrum is treated as if it is a simple mixture of reference spectra from a set reference spectra. The reference spectra may be for specific chemical elements or for a compound material. The process starts by mixing the individual reference spectra to try to reproduce the unknown spectrum detected by the gamma ray detectors 18. Threat detection and material identification are based on relative abundance of chemical elements (ratios), as determined from the estimated contribution from each of the reference spectra to form the unknown spectrum. It can then be determined whether the relative abundances correspond to an anomalous element or compound. This type of processing relies on having a set of reference spectra that form a good basis for all of the spectral content.

Another method of processing the API data relies on filtering the detected spectrum to reduce the impact of the unpredictable noise. This type of processing first distills out the most reproducible and most relevant features of the spectrum and is appropriate when the spectrum contains some combination of unpredicted content or can not be treated as a simple mixture. The peaks in the gamma ray energy spectrum are detected as a first step. The peaks within the spectrum represent the component of the spectra that are least affected by unpredictable sources of background. A differential filter is applied to the spectrum in order to detect where peaks are located, the area contained within each peak, and the uncertainty in each estimated area.

The peaks are located at certain areas of the spectrum that correspond to known elements. The distilled information regarding the peaks is used to estimate abundance of certain chemical elements, as well as to estimate the uncertainties in the abundances. The detected elements can then be grouped and it can be determined to which compound the elements correspond. For example, if the peaks correspond to a compound of carbon, nitrogen and oxygen, the compound may be nylon, or may be an explosive. The threat detection and material identification are based on relative abundance of chemical elements (ratios), as determined from the estimated abundances. Thus, a combination of carbon, nitrogen and oxygen that has one ratio will be identified as nylon, while the same combination of elements with different ratios will be identified as an explosive.

It will be appreciated that one or more of the above (or other) methods of processing the API data may be implemented in the inspection system 10. For example, the macrovoxels may be processed by matching the aggregated API data for each macrovoxel to a library of known spectra for one or more elements that are common in dangerous or illegal materials, such as nitrogen, for example. Those voxels contained in macrovoxels that have a certain level of nitrogen can then be selected for further processing to determine the relative abundances of the other elements. By determining the relative abundances of the other elements in the voxels, it is possible to determine the elemental makeup of the contents of the article and whether the contents of the article are anomalous.

Further refinements to the methods of analysis are possible by means of enhanced processing that provides better determination of the ratio of chemical elements. The material identification is based on the relative abundances of chemical elements (ratios). The practical limits for reproducibility and consistency of the ratios are be based on: (a) physically having just one material in the volume of interest, (b) the inherent spatial resolution of the system, (c) the amount of degradation of the spatial resolution caused by scattering, (d) the amount of spectral coloring caused by scattering, (e) the level of background from all sources, and (f) the amount of data collected.

The in situ determination of time-independent background is used to estimate the contribution from this source of background. The effects from scattering can be addressed with advanced processing, which uses information about the spatial distribution of materials in order to estimate the contribution from the scattering of neutrons and gamma rays to the sample spectrum. If the algorithm is not provided with data on material densities, it will use the API data to estimate the density in a self-consistent way starting with the material closest to the neutron generator, and then proceeding to other locations. The spectral coloring that gamma ray scattering introduces is estimated by using two different peaks from the same chemical element, oxygen for example, and estimating line integrated density of materials between the volume element and the gamma ray detector.

The results of the analysis, e.g., the elemental makeup of the identified region(s) of interest, can then be displayed on a monitor 54. Two embodiments of an exemplary graphical user interface (GUI) 56 are shown in of FIGS. 4A-4B. The GUI 56 provides a simple interface for the user to control the inspection system 10 as well as to display identified threats in an intuitive manner through position referencing with an image from the imaging device 26. The GUI may be used to display the elemental makeup of each region of interest identified by the localizer 28 or to display the elemental makeup of only those region(s) of interest that have been determined to include an anomalous element (e.g., less than all of the region(s) of interest identified by the localizer). The GUI also may provide an interface that allows an operator to select regions of the article to see the elemental makeup of that region, for example, by selecting a portion of the article with a mouse or other input mechanism to view the corresponding elemental makeup for that region of the article.

In the embodiment of FIG. 4A, the GUI 56 is shown as it may appear when the inspection system is used to inspect a car or other vehicle. In this example, a single region of interest 60 has been identified by the localizer 28 or only one region of interest 60 was found to include an anomalous element. The GUI 56 includes an image 58 of the inspected vehicle overlaid by a single region of interest 60 identified by the localizer 28 and a color-coded map or grid of the elemental makeup 62 of the contents of each voxel in the region of interest 60.

The colors used to present the elemental makeup 62 may correspond to the relative threat posed by the material in the region of interest 60. For example, the areas of the region on interest 60 in which anomalous materials were not found may be colored green, while the area in which an anomalous material was found may be red or yellow depending on the relative levels of concentration of the anomalous element. In another example, the colors used to present the elemental makeup may correspond to the relative threat level presented by the materials in the region of interest 60. For example, red may be used to identify known anomalous elements, orange or yellow may be used to identify suspected anomalous elements or elements that may be easily combined or mixed to create an anomalous element, green may be used to identify non-anomalous elements, and blue may be used to identify those elements that cannot be classified. The colors also may correspond to different categories of anomalous elements, such as red for explosives, yellow for narcotics, orange for biological or chemical agents, and green for harmless elements. As will be appreciated, these are but a few examples of how the elemental makeup of the region of interest 60 may be presented.

Another embodiment of the GUI 56 is shown in FIG. 4B. In this embodiment, the GUI 56 is shown as it may appear in a luggage inspection system. The GUI 56 includes an image 64 of the luggage being inspected. In this example, the localizer 28 has identified three regions of interest 66a-c, which are each displayed with a color-coded map or grid showing the elemental makeup 68a-c of the contents of the voxels within each region of interest 66a-c. As described with respect to FIG. 4A, the elemental makeup 68a-c of each region of interest 66a-c may be color-coded to show the level of threat and/or the materials located within each region of interest.

Referring back to FIG. 2, and with additional reference to FIG. 5, the GUI 56 may include an analysis algorithm 70 to display when a threat is detected automatically. At functional block 72, it is determined if the analyzer 30 has detected an anomalous element in one or more of the identified region(s) of interest. The anomalous material may be a material or compound, or may be separate regions of the article that contain different materials than can be combined easily to form an anomalous material, but which otherwise may be non-anomalous. The anomalous material may be an illegal drug, weapon, explosive, chemical/biological agent, etc.

If an anomalous element has been detected by the analyzer 30, the GUI algorithm proceeds to functional block 74 in which GUI is configured to display the identified region(s) of interest and the elemental makeup of the materials within the region(s) of interest on the display monitor 54. As shown in FIGS. 4A-4B, the region(s) of interest and the elemental makeup of the materials contained within each region of interest may be overlaid on an image of the article being inspected.

At functional block 76, the GUI is configured to actuate an alert mechanism to indicate that an anomalous material has been detected. The alert mechanism may be an electronic, audible, and/or visual alert. The GUI 56 also may be configured to sound and/or display an alarm or alert on the display monitor 54 to alert the operator of the detected anomalous condition. For example, in the embodiments of FIGS. 4A and 4B, the alert may be a popup window 88 on the display that identifies the location and/or nature of the anomalous material. The inspection also may include a siren or other signal that alerts the operator or bystanders that a threat has been detected.

Referring back to FIGS. 4A and 4B, the GUI 56 also may be configured to display additional information related to the inspection process, including the time and date 90 of the inspection as well as an inspection progress indicator bar 92 showing the estimated time of completion of the inspection. The GUI 56 also may provide a system control interface 94 for controlling the inspection system through an input/output controller 98 in the computer. The GUI 56 also may include an indicator 96 to display the system state, for example, if the system is ready to inspect an article, is actively inspecting the article, or is busy or otherwise unavailable. The GUI 56 also may provide functionality that allows the user to input comments related to a particular article that has been inspected and to backup the data. The GUI 56 also may include functionality related to the localizer 28 to allow an operator to manually select or to identify the region(s) of interest.

Referring back to FIG. 1, the inspection system 10 may include an article conveyance mechanism 100 for transporting articles into the inspection system 10. The article conveyance mechanism 100 may be controlled by the conveyance mechanism controller 102 in the computer 20, which may be controlled automatically and/or manually through the system controls 94 on the GUI 56. The control circuit 102 may control the conveyance mechanism 100 to move a bag or other article through the entry to the inspection system 10. The conveyance mechanism 100 may be a continuous belt the transports the article out of the inspection system 10 after the article has been inspected.

The conveyance mechanism controller 102 may be configured to move the article through the inspection system 10 at a continuous pace such that the inspected articles are continuously moving through the inspection system 10, for example, as part of a system for inspecting luggage and loading it onto an aircraft. If an anomalous element is detected, the conveyance mechanism controller 102 may be configured to stop the article conveyance system 10 to allow appropriate precautions to be taken to neutralize the threat posed by the anomalous material.

The conveyance mechanism 100 incorporates a known material within the field of view of both the API device 12 and the imaging device 26 such that the devices are position referenced relative to one another to facilitate registration of the API data with the image data from the imaging device 26. By registering the API data and the image data, the localizer 28 and data selector 32 have a common point of reference for localizing the region(s) of interest and for selecting the API data that corresponds to the identified region(s) of interest.

The API device 12 and the imaging device 26 may be position referenced by one or more indicators affixed or integrated with the material conveyance system that are visible to both the API device 12 and the imaging device 26. The one or more indicators may be affixed to a tray or other container into which the article to be inspected could be placed. The displacement of the conveyance system also may be used to register the API data and the image data. Once the initial imaging is done to identify the one or more regions of interest the package is displaced some distance by the belt to a known position in front of the API device without substantially moving the article on the conveyance system such that the relative position of the article with respect to the API device is lost.

Another alternative is to determine the position of the article with sensors such as a mechanical or simple optical sensor arrangement. For example, the sensor may incorporate a reflective tape at key points on a tray or other container and a laser pointer for detecting the reflective tape.

Figure 6:
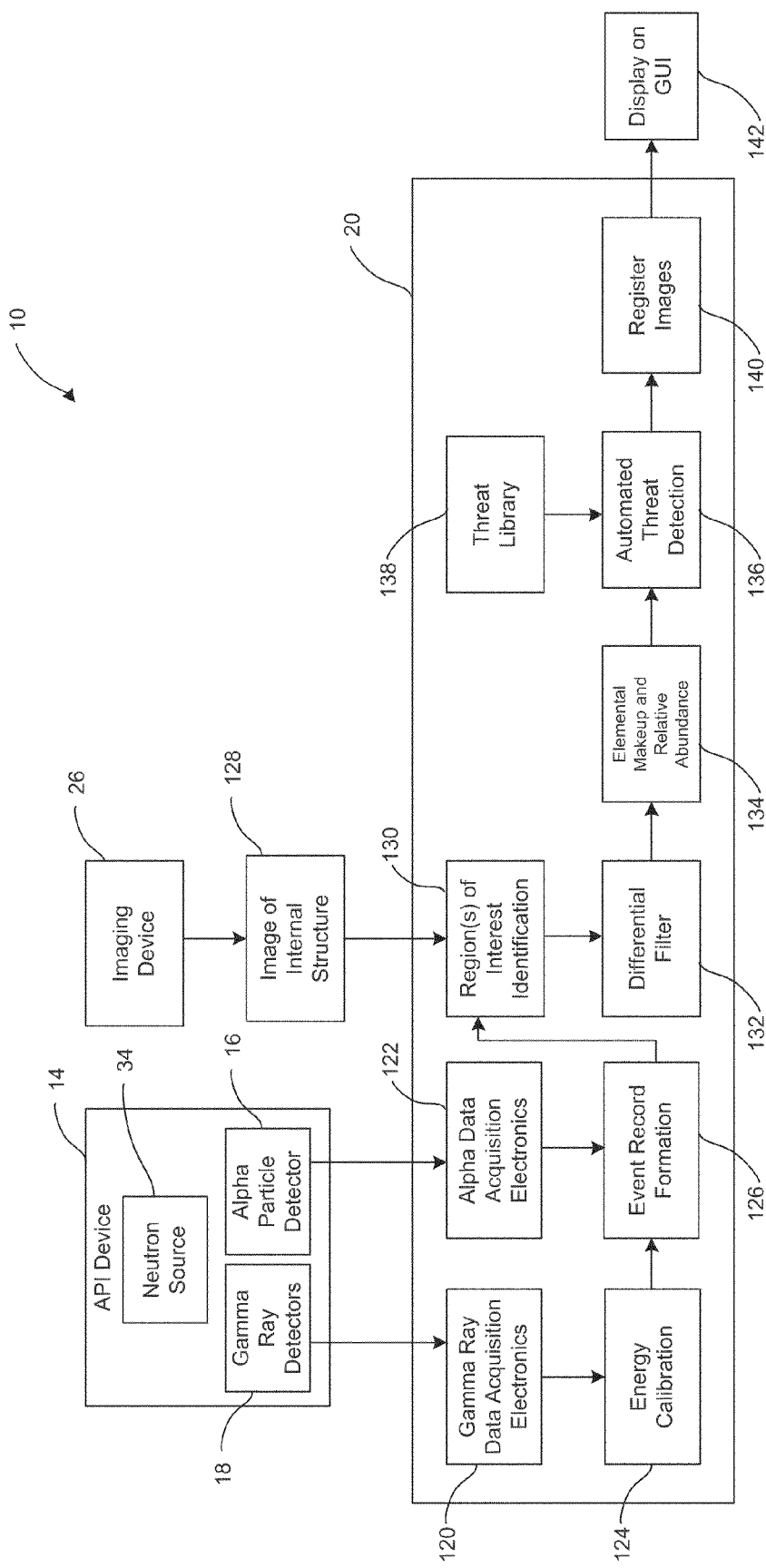
FIG. 6 is a schematic block diagram illustrating data flow and processing in the inspection system.

Referring now to FIG. 6, a schematic block diagram illustrates the flow of data within the article inspection system 10. As will be appreciated one or more of the functional blocks in FIG. 6 may be included in a computer system, such as the computer system 20 or a separate computer system. As shown in FIG. 6, data from the gamma ray detectors 18, such as the time that the gamma ray was detected and the radiation spectrum or gamma ray signature, are supplied to gamma ray data acquisition electronics 120. The data collected by the alpha particle detector 16, including the x, y coordinates of the detected alpha particle, are supplied to the alpha particle data acquisition electronics 122.

In block 124, the spectra from the gamma ray detectors 18 are calibrated. The calibration processing starts with a pulse height spectrum from each detector in the set of gamma ray detectors. Two reference peaks are identified within the spectrum. The position of each measured reference peak is compared to the expected position of the peak. The difference between the peaks is used to calibrate each detector back to a standardized response.

After energy calibration 124, the data from gamma ray data acquisition electronics 120 and the data from the alpha particle data acquisition electronics 124 are combined or accumulated in functional block 126 to form an event record for each neutron interaction. The event records for each neutron are accumulated to form the output of the API device 12, which is used to determine the elemental makeup of the identified region(s) of interest in the article.

The imaging device 26, such as an x-ray imager, captures an image of the internal structure of the article being inspected at functional block 128. As will be appreciated, the internal structure includes all of the materials that form the article, including the external materials or shell that surround the interior portion of the article. For example, if the article is a suitcase, the internal structure of the suitcase includes all of the materials that form the suitcase, such as the lining, the outer shell, exterior pockets, zippers, handles, wheels, etc. The image also may be a two-dimensional or a three-dimensional image.

At functional block 130, the imagery data from the imaging device 26 is processed by the localizer 28 to identify the areas or regions of interest in the article, as described above. Also in functional block 130, the data selector 32 selects the data from the event record that corresponds to the identified region(s) of interest, which may be the areas of uniform or homogenous density in the image.

At functional block 132, the selected event record data for the identified region(s) of interest is filtered through a differential filter. The identification of the elemental makeup and the relative abundances of the elements in any compounds contained with the region(s) of interest are determined at functional block 134. The different processes and methods for analyzing the output of the API device 12 to determine the elemental makeup of the materials in the region(s) of interest are described above.

The detected elemental makeup for the identified region(s) of interest is then used for automated threat detection at functional block 136. The automated threat detection may be performed by comparing the identified elemental makeup and relative element abundances to a threat library 138 to determine whether the elemental makeup or relative abundances of the elements in the region(s) of interest are indicative of an anomalous condition, as described above.

At functional block 140, the elemental makeup of the regions of interest and the imagery data from the imaging device are registered with one another such that the elemental makeup of the regions of interest can be displayed over the image of the article. As described above, the GUI 56 activates an alert based upon the level and type of threat posed by the anomalous element, as shown at functional block 142. The operator also may select different portions of the image of the article being inspected to view the elemental makeup of that particular region or area of the article.

An exemplary method 200 of inspecting an article for anomalous materials is shown in FIG. 7. Although the method of FIG. 7 is described primarily with respect to an inspection system that includes an API device 12 and a separate imaging device 26, it will be appreciated that the method also could be performed using only the data from the API device, as described in detail with respect to FIG. 8 below.

In functional block 205, image data for the article being inspected is obtained. As described above, the image data may be obtained a separate imaging device 26, such as a camera or an x-ray imager. The image of the structure of the object being inspected may used to identify the region(s) of interest of the article that may contain an anomalous element and to thereby reduce the amount of data that needs to be processed and the processing time needed to determine the location and type of threat presented.

At functional block 210, the API device 12 inspects the entire area or volume of the article. The output of the API device 12 includes data representative of the contents of the entire article, however, only portions of the output of the API device 12 are analyzed to determine whether the article contains an anomalous element. These portions of the output of the API device 12 are identified by the localizer 28 in functional block 215.

At functional block 215, the localizer identifies only those regions of the article that appear likely to contain an anomalous element. As previously described, if the system 10 utilizes a separate imaging device 26, the identified region(s) of interest can be selected to correspond to areas of uniform or homogenous density in the article. The region(s) of interest also may be identified from the image data based upon the size and/or shape of the suspected contraband material. For example, when searching for chemical or biological threats, the system may search for objects having the shape of a canister in which the chemical or biological elements may be stored.

The image data may be displayed on a monitor 54 for an operator of the inspection system to identify the region(s) of interest manually. For example, the operator may review an x-ray image of a parcel and manually select those regions of the parcel that appear suspicious. The manual selections may be input through the GUI 56 and the input/output controller 98 of the computer 20. It will be appreciated that the inspection system 10 also may include a combination of automated and manual identification of region(s) of interest, and may present the operator with suggested or recommended region(s) of interest for further inspection, which the operator may accept, reject, or supplement based upon his independent analysis of the image data.

The region(s) of interest also may be identified by aggregating the output of the API device 12 into macrovoxels to reduce the amount of data. The aggregate data may then be processed for each macrovoxel to determine which macrovoxels are likely to contain an anomalous element. The region(s) of interest are then identified as those macrovoxels that are likely to contain an anomalous element.

At functional block 220, the data selector 32 selects the portions of the output of the API device 12 corresponding to the identified region(s) of interest. The data may be selected based upon the spatial coordinates of the region(s) of interest identified by the localizer 28 and the output of the API device 12 for the voxels that correspond to the identified region(s) of interest.

The selected output of the API device 12 is analyzed by the analyzer at functional block 225 to determine the elemental makeup of the materials in the identified region(s) of interest. As described above, the elemental makeup can be determined by a number of different processes. By selecting only those portions of the API output that correspond to the identified region(s) of interest, the amount of data that must be processed to determine the type and location of any anomalous materials is significantly reduced. This reduces the amount of time needed to analyze the contents of the article.

At functional block 230, the image from the imaging device 26 and the elemental makeup of the identified region(s) of interest are registered with one another. At functional block 235, the location and type of anomalous elements are displayed to the operator. The image of the article and the elemental makeup of the region(s) of interest are registered such that the elemental makeup of the region(s) of interest is overlaid on the portion(s) of the image to which the region(s) of interest correspond. For example, if a region of interest is a bottle, the elemental makeup of the bottle will be directly overlaid on the image of the bottle such that the displayed elemental makeup of the bottle is in the shape of the image of the bottle. Registering and displaying the elemental makeup of the region(s) of interest in this manner provides an intuitive display on the GUI 56 for an operator of the inspection system 10 to evaluate the threat posed by any detected anomalous elements. As described above, the GUI 56 may include one or more algorithm to determine the nature of the identified threat and to activate an appropriate alert, which may be based upon the nature of the threat or the type of materials identified by the analyzer.

The combination of the API device 12 and the separate imaging system 26 thus may reduce the overall time for analyzing the article. The reduction in analysis time is due in part to the fact that the system level detection and false alarm rates are an aggregate function of the individual voxel false alarm rates. As the voxels become smaller so as to detect smaller threat quantities the number of analyzed voxels increases, which causes a corresponding system level false alarm rate to increase. Since the system level false alarm rate is a parameter for measuring the performance of the system, being able to maintain smaller voxel sizes while managing the false alarm rate is important.

The use of the separate imaging device 26 can improve the performance of the system by utilizing the features in the imagery data that are associated with contraband materials, such as size, shape, density, etc. The spatial coordinates that outline the suspected contraband are utilized to form the boundary of voxels that are grouped into a macrovoxel and to maximize the relevant data for the analysis. The voxels may be shaped based upon uniform density identified by a separate imaging device 26. The selected voxels correspond to the shape of the uniform density in the image and the radiation spectra, or output from the API device 12, are aggregated for each region of uniform density into a macrovoxel. The aggregated spectrum is then analyzed, as described above, and suspicious macrovoxels, which also are regions of uniform density, are identified. The individual voxels that are included within each suspicious macrovoxel are analyzed to determine the elemental makeup of the contents of the article in the voxel. The results of the analysis can then be displayed with the GUI to identify the location of anomalous materials in the article. By performing the inspection in this manner the number of voxels to be analyzed is reduced and the amount of data per voxel is increased, which results in improved statistics. The overall computing time also is reduced, resulting in quicker inspection times and lower system level false alarm rates.

Also, when the internal data represents density distributions, the inspection system 10 can utilize this information to correct for physical distortions in the data such as neutron and gamma ray scattering to improve the overall performance. More precisely, the inspection system can utilize the density distribution within the inspected volume to correct for the scattering and energy loss of the neutrons that otherwise would be incorrectly correlated to a different position within the inspected volume. For example, as a neutron travels through the inspected volume it may interact with materials that change its trajectory, but a gamma ray may not be detected by the system. If the same neutron interacts again with another and a gamma ray is detected, the system will correlate the position of the neutron-gamma interaction along the initial neutron trajectory and thus assign the data to an incorrect voxel. This incorrect correlation will produce additional background in the voxels and degrade the signal-to-noise ratio. It is also possible for the neutron to scatter into the contraband material and produce data that is assigned to a voxel outside of the contraband material. This effect causes a reduction in the signal-to-background ratio and thus reduces system performance.

To deal with these data correlation issues the system utilizes the density data along the initial neutron trajectory to determine the likelihood of neutron scattering and then makes corrections to the voxels that data is assigned to based on statistical probabilities. By processing the data in this manner the system can more effectively deal with inspection scenarios where there will be a significant level of non threat material cluttering the inspection volume.

FIG. 8 shows another method 300 of analyzing the output of the API device 12 to identify region(s) of interest in the article and to determine if the region(s) of interest contain an anomalous element.

At functional block 305 the article is inspected with the API device 12 and the output of the API device 12 is collected for the entire article. The API data is organized according to voxels that correspond to the size and shape of the inspected article. Thus, after inspection with the API device, all of the data for determining the elemental makeup of each voxel is available. The system, however, only analyzes a portion of the data to determine whether the article includes an anomalous element.

At functional block 310, the output for each voxels is aggregated or summed together to form macrovoxels. To aggregate the voxels, the gamma ray signature, or radiation spectrum, for each voxel can be summed or added together to form a radiation spectrum for each macrovoxel. Aggregating the voxels into multiple macrovoxels reduces the amount of data for analysis and therefore reduces the analysis time needed to identify the region(s) of interest. For example, if the system includes API data for 100,000 voxels, the output for the voxels can be aggregated into 1,000 macrovoxels. The processing time for analyzing 1,000 macrovoxels is significantly faster than the processing time for analyzing 100,000 voxels, and therefore, computing resources are preserved and the time for inspection is reduced.

The size of the macrovoxels may be controlled by the number of voxels, for example, 100 voxels in each macrovoxel, or may be controlled based upon the location of the macrovoxel relative to the neutron source. The size of the macrovoxel also may be set or be controlled by an operator based upon the minimum size of the threat material. For example, if the system is used for vehicle inspection, the minimum size of a threat material may be 200 kilograms of an explosive, and therefore, the size of the macrovoxels may be selected to correspond to the size of an object that would contain 200 kilograms of explosive or such that the macrovoxels are small enough to correspond to volumetric regions that will contain at least a portion of the explosive material.

The API device 12 may have a conical field of view as is typical. Due to the conical field of view, the voxels that are closer to the neutron source may be smaller in size than the voxels that are further away from the neutron generator. Thus, a macrovoxel that is close to the neutron source may be smaller in size but contain the same number voxels as a macrovoxel that is the same size, but which is located further away from the neutron generator. To account for the varying amounts of data that is included in the macrovoxels, the size of the macrovoxels may be automatically varied or scaled according to the distance of the macrovoxels from the neutron generator.

At functional block 315, the aggregate spectrum for each macrovoxel is analyzed to determine if the macrovoxel is likely to contain an anomalous element. The analyzer 30 analyzes the aggregated API output for each macrovoxel to determine if an anomalous material is likely to be present, e.g., to determine if any of the macrovoxels appear to contain a suspicious element or material. If the elemental makeup of a macrovoxel indicates that the macrovoxel may contain an anomalous element, the macrovoxel is identified by the localizer as a region of interest. Each macrovoxel is analyzed in the same manner to determine which macrovoxels warrant further analysis and should be identified as a region of interest.

In functional block 320, the individual voxels contained within each identified macrovoxel are analyzed to determine the precise elemental makeup of the contents of the article in the location corresponding to the voxel. Because the API data may include spectrums from anomalous elements and also data from non-anomalous elements, aggregating the API output for the voxels into macrovoxels results in a mixing effect in the data. By identifying those macrovoxels that are likely to include an anomalous element and then further analyzing the voxels that are included within the macrovoxels, the mixing effects can be reduced or eliminated to determine the size, shape, and elemental composition of the potentially hazardous items. This reduces the number of false alarms that may result from the mixing effect.

At functional block 325, the elemental makeup of the voxels is processed to determine if the elemental makeup is anomalous. The processes for analyzing the elemental makeup of the and for determining whether the elemental makeup is anomalous are described above. If an anomalous element is detected, the system displays the detected threat and the system activates an appropriate alert as shown at functional block 330.

As will be appreciated, the method 300 of FIG. 8 may be used in conjunction with the imagery data from the separate imaging device 26. In such an embodiment, the imagery data can be used to identify regions of uniform density in the article. The API data for the voxels corresponding to the regions of uniform density can then be aggregated to form a macrovoxel that corresponds to the region of uniform density, e.g., such that the shape of the macrovoxel is the same as the region of uniform density in the article. The aggregated API output can then be analyzed to determine if the article is likely to contain an anomalous element. The voxels contained within the identified macrovoxels can then be further analyzed to determine the elemental makeup and whether the contents of the article are anomalous.

The inspection system 10 may use a combination of the methods of FIG. 7 and the method of FIG. 8 to inspect an article for anomalous materials. Using both disclosed techniques, which may be referred to as boosting, can increase the accuracy of the system. For example, the system may inspect the article using the API output and macrovoxel technique and the separate imaging system independently of one another. By comparing the results and/or evaluating the threats detected by both techniques, the false alarm rates of the individual techniques may be reduced.

Figure 9:
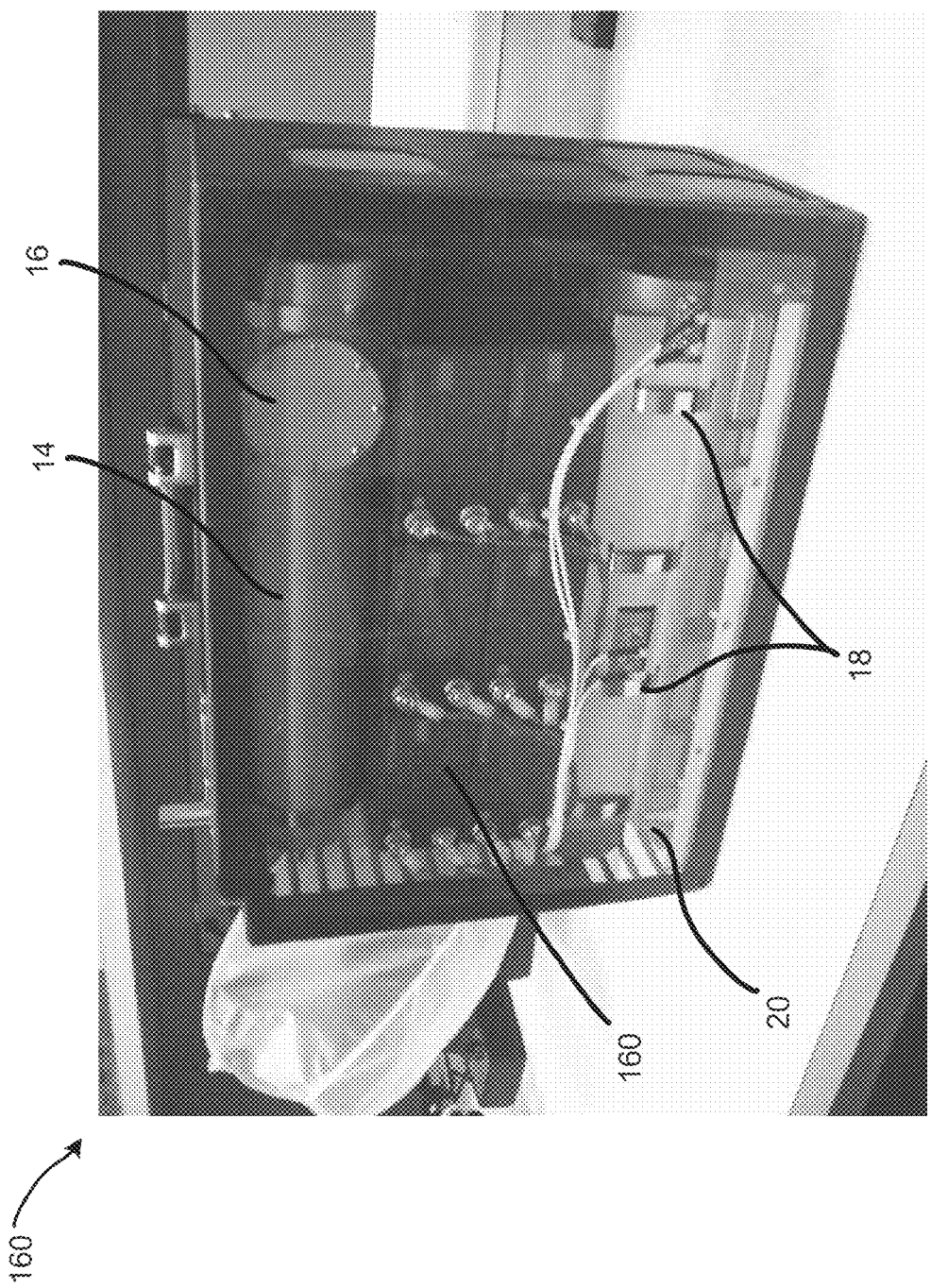
FIG. 9 is an isometric view of an exemplary portable inspection system according to the present invention.

Another embodiment of an inspection system 160 is shown in FIG. 9. The inspection system 160 of FIG. 9 is similar in operation to the inspection system 10, and utilizes similar processing methodologies and steps. The portable inspection system includes an API device, which includes a neutron generator 14, an alpha particle detector 16 and a gamma ray detector 18. The portable system also may contain a computer system 20 or be connected to a stand alone computer system, such as a laptop computer, to identify the region(s) of interest, to process the API data, and to determine whether the inspected article contains an anomalous element. As will be appreciated, the computer system may be the same or similar to the computer system 20 described above and may include such functionality as a localizer, data selector, analyzer, image processing device and GUI. The portable system 160 also contains a power supply, such as batteries 161. The portable system 160 also may be connected to a separate power supply, such as, with a wall plug or other electrical power supply.

The portable inspection system 160 increases the portability of the fixed system illustrated in FIG. 1, and therefore may useful in the inspection of shipping containers, vehicles, or other articles that may not be inspected easily with the stationary system of FIG. 1.

Although described primarily with the processing three-dimensional data, it will be appreciated that the concepts described herein are equally applicable to the processing of two-dimensional data. For example, the output of the API device may be correspond to pixels, similar to the voxels described above, and the data for each pixel may aggregated to form macropixels, similar to the macrovoxels described above. Likewise the image data may be two-dimensional image data. The data may be processed in the same manner as above to identify region(s) of interest, to determine the elemental makeup of the contents of the article in the region(s) of interest and to determine whether the region(s) of interest include an anomalous element.

The inspection system of FIG. 1 is described as being operable primarily to inspect luggage. It will be appreciated that the inspection system and the concepts described herein may be used in any environment in which dangerous or illegal materials may be present. For example, the inspection system can be used to inspect large freight or cargo shipping containers commonly used for shipping goods overseas or railroad cars or to inspect cars, trucks or other vehicles. The inspection system also could be used to inspect mail or other parcels, for example to detect explosives, or chemical and biological agents that may be sent through the mail.

While for purposes of simplicity of explanation, the flow charts or diagrams described herein include a series of steps or functional blocks that represent one or more aspects of the relevant operation of the inspection system 10, it is to be understood and appreciated that aspects of the present invention are not limited to the order of steps or functional blocks, as some steps or functional blocks may, in accordance with aspects of the present invention, occur in different orders and/or concurrently with other steps or functional blocks from that shown and described herein. Moreover, not all illustrated steps or functional blocks of aspects of relevant operation may be required to implement a methodology in accordance with an aspect of the invention. Furthermore, additional steps or functional blocks of aspects of relevant operation may be added without departing from the scope of the present invention.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An inspection system for determining the elemental makeup of contents of an article comprising:
a localizer for identifying at least one region of interest of the article from data representative of contents of the article, the at least one region of interest having a cross-sectional area or a volume that is less than the entire cross-sectional area or the entire volume of the article;

an associated particle imaging device that produces an output that is indicative of the elemental makeup of contents of the article;

a data selector for selecting a portion of the output of the associated particle imaging device that corresponds to respective identified regions of interest; and an analyzer for analyzing the portions of the output of the associated particle imaging device selected by the data selector, to the exclusion of other portions of the output, to determine the elemental makeup of contents of the article in each identified region of interest.

2. The inspection system of claim 1, wherein the data representative of contents of the article is generated by the associated particle imaging device or an imaging device.

3. The inspection system of claim 2, wherein the data representative of contents of the article is comprised of a plurality of macrovoxels corresponding to volumetric regions of the article;
wherein the analyzer analyzes the data representative of contents of the article to determine which macrovoxels are likely to contain an anomalous element; and
wherein each identified region of interest corresponds to a respective macrovoxels that is likely to contain an anomalous element.

4. The inspection system of claim 3, wherein each macrovoxel is comprised of a plurality of voxels; and
wherein the portions of the output of the associated particle imaging device selected by the data selector includes the voxels in each macrovoxel that is likely to contain an anomalous element.

5. The inspection system of claim 2, wherein the imaging device obtains an image of contents of the article, and the regions of interest are identified by the localizer from areas of uniform density in the image.

6. The inspection system of claim 5, wherein the imaging device comprises one of an X-ray imaging device, a gamma ray imaging device, a terahertz imaging device, or a computed tomography imaging device.

7. The inspection system of claim 1, further comprising a conveyance mechanism for transporting a plurality of articles to the inspection system.

8. The inspection system of claim 1, further comprising a controller to control the inspection system to coordinate the inspection of the plurality of articles.

9. The inspection system of claim 1, further comprising a graphical user interface and a display for graphically displaying the elemental makeup of contents of the article in each region of interest.

10. The inspection system of claim 1, further comprising an alert mechanism that is activated in the event that the determined elemental makeup of contents of at least one identified region of interest indicates the presence of one or more anomalous materials.

11. A method for determining the elemental makeup of contents of an article comprising:
identifying at least one region of interest of the article from data representative of contents of the article, the at least one region of interest having a cross-sectional area or volume that is less than the entire cross-sectional area or the entire volume of the article;
inspecting the article with an associated particle imaging device, the associated particle imaging device producing an output that is indicative of the elemental makeup of contents of the article;
selecting a portion of the output of the associated particle device that corresponds to respective identified regions of interest; and
analyzing the selected portions of the output of the associated particle imaging device, to the exclusion of other portions of the output, to determine the elemental makeup of contents of the article in each identified region of interest.

12. The method of claim 11, further comprising generating the data representative of contents of the article with an associated particle imaging device or an imaging device.

13. The method of claim 12, wherein the data representative of contents of the article is separated into a plurality of macrovoxels corresponding to volumetric regions of the article; and
wherein identifying at least one region of interest further comprises:
analyzing the output of the associated particle imaging device for each macrovoxel; and
identifying the macrovoxels that are likely to contain an anomalous element, wherein each identified region of interest corresponds to a macrovoxel that is likely to contain an anomalous element.

14. The method of claim 13, wherein each macrovoxel includes a plurality of voxels, the method further comprising selecting portions of the output of the associated particle imaging device that correspond to the voxels in each identified macrovoxel.

15. The method of claim 12, wherein the data representative of the contents of the article includes an image from the imaging device;
wherein identifying at least one region of interest comprises identifying at least one area of uniform density in the image.

16. The method of claim 11, wherein analyzing of the selected portions of the output of the associated particle imaging device comprises determining the elemental makeup of contents of the article in each identified region of interest by comparing the output of the associated particle imaging device to a library of expected outputs.

17. The method of claim 11, wherein analyzing of the selected portions of the output of the associated particle imaging device using a linear mixing model to determine the elemental makeup of contents of each identified region of interest.

18. The method of claim 11, wherein analyzing the selected portions of the output of the associated particle imaging device comprises analyzing peaks in the output of the associated particle imaging device to determine estimated abundances of constituent elements of the contents of each identified region of interest.

19. The method of claim 11, further comprising transporting a plurality of articles for inspection with an article conveyance mechanism.

20. The method of claim 11, further comprising displaying the elemental makeup of each identified region of interest with a graphical user interface on a display.

* * * * *